Aug. 22, 1933.  H. C. HAYES  1,923,088
VIBRATION DETECTOR
Original Filed Sept. 23, 1927   2 Sheets-Sheet 1

HARVEY C. HAYES
INVENTOR

BY *Robert A. Lavender*
ATTORNEY

Aug. 22, 1933.  H. C. HAYES  1,923,088
VIBRATION DETECTOR
Original Filed Sept. 23, 1927  2 Sheets-Sheet 2

HARVEY C. HAYES
INVENTOR

BY *Robert A. Lavender*
ATTORNEY

Patented Aug. 22, 1933

1,923,088

UNITED STATES PATENT OFFICE 1,923,088

VIBRATION DETECTOR

Harvey C. Hayes, Washington, D. C.

Original application September 23, 1927, Serial No. 221,520. Divided and this application December 8, 1930. Serial No. 500,841

3 Claims. (Cl. 177—352)

(Granted under the Act of March 3, 1883, as amended April 30, 1928; 370 O. G. 757)

This case is a division of my copending application covering vibration detectors Serial No. 221,520, filed September 23, 1927, Patent No. 1,892,147.

It has been a primary object of this invention to devise means for detecting vibrations which are produced in the surface of the earth either in the form of sound waves or of waves having a frequency outside of the range of audibility. An important feature of this invention is the construction of a device which is capable of picking up vibrations with equal facility over a wide range of direction. This is quite important where the precise direction from which the vibration emanates is not known and where it is desired to take note of the magnitude of the vibrations received.

While the device contemplated by the present invention is not limited to use in solid ground, but can be used for the reception of sound waves through water or directly through the air, it is particularly well suited for the reception of earth tremors and the like. One instance of the use to which the detector of the present invention can be put is for the reception of waves artificially set up in the ground, as by the explosion of a charge of dynamite, so that the character of the waves may be readily studied. It is well known that the amplitude and other characteristics of waves of this type vary materially with the nature of the media through which they have travelled and also in accordance with whether they are directly received or received after refraction or reflection.

An object of the invention has been to construct a device for the purposes specified in such a way that the mechanical energy of the sound or similar wave may readily be converted into electrical energy. This conversion, furthermore, has been brought about without sacrificing any of the inherent characteristics of the original wave so that the records produced by the electrical means will give an accurate indication of the nature of the original waves.

It has been an object to provide a very intimate contact between the device and the earth whose vibrations it is designed to detect. For this purpose the outer casing of the instrument has been formed in the shape of a cone having a gradual taper and being of sufficient dimension to insure its movement with the earth. To aid in providing this movement with the earth, furthermore, the casing has been constructed of suitable material and of appropriate thickness so that the device will have substantially the same average density and the same center of gravity as the earth into which it is inserted.

In the operation of the device which is based upon the general principles of magneto-electrical devices the casing is adapted to partake of the vibrations to be recorded while an inertia member within the casing remains substantially stationary. This provides the necessary relative movement between certain magnetic poles and adjacent magnetic conductors to create the desired variations in the flux passing through suitable coils located in the magnetic field. It is an object to so arrange the magnets and coils that the effects will be combined and will be substantially uniform over a wide range of direction of reception.

The invention also contemplates a modification whereby the device may be made to detect both horizontal and vertical vibrations, or such components of waves coming from any direction between the horizontal and vertical planes.

With these and other incidental objects in view one form of the invention will now be described with reference to the accompanying drawings which form a part hereof and in which Figure 1 is a cross sectional view in elevation of the assembled vibration detector.

Figure 1:
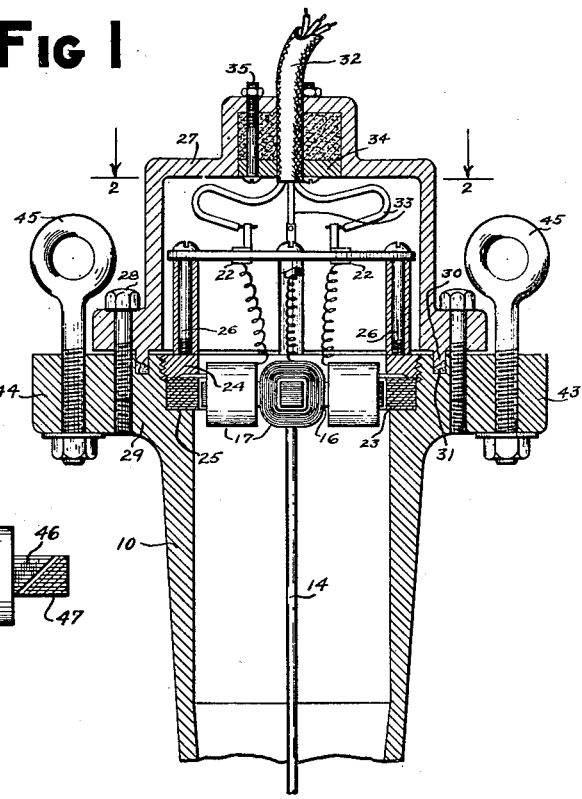

Referring now to Figure 1 it will be noted that the main body of the device is formed by a conical casing 10 of any suitable material, preferably such that with other parts, as will be explained, it will create a mass having an average density substantially the same as that normally encountered in surface soil. Aluminum has been found very satisfactory for this purpose. In practice it has been found desirable to make this casing of considerable length, approximately 30 inches over all, and the average thickness of the wall is preferably between ¼ and ½ inch. For a distance of a few inches from the lower tip of the cone it is substantially solid, except for an opening 11 which is drilled through this lower portion. Above the substantially solid part there is a large cavity or opening practically in the form of a frustrum of a cone which leaves only a wall of the desired thickness, such as mentioned. The cone preferably tapers from a relatively sharp point to an outside diameter in the neighborhood of five inches while the opening is approximately three inches in diameter at the top.

In order to facilitate the insertion of the cone into the earth it is provided with a steel point 12 having a screw threaded extension 13 adapted to be fitted into a screw threaded opening at the lower end of the conical casing. The outer surface of the tip as shown is designed to form a smooth even contour with the lower end of the casing. If desired the tip may be locked into position when screwed into place by means of a countersunk set screw extending through the lower wall of the casing.

Figure 3:
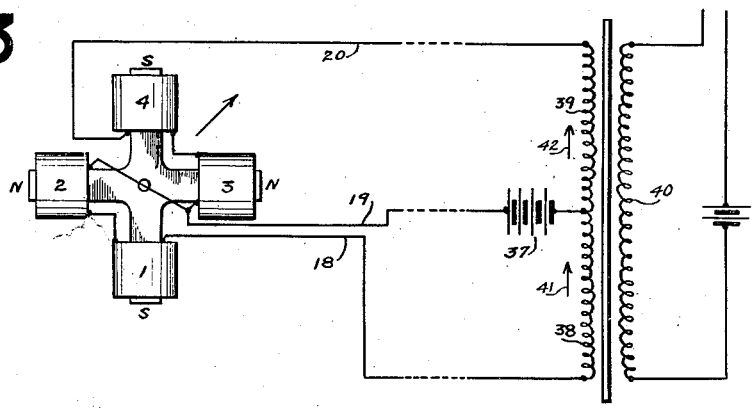
Figure 3 is a diagrammatic view of the circuits employed in the use of the device.

A resilient rod 14 of sufficient length to have a low natural frequency of vibration and made of any suitable material, preferably brass, carries a screw threaded tip 15 which is also adapted to fit into a threaded portion at the lower end of the conical casing. The rod extends upwardly through the opening 11 and into the larger cavity of the cone to a point substantially at or near the upper surface of the cone. This rod is adapted to support an armature 16 which, as shown, is preferably formed as a cross to provide four separate pole pieces. The armature, which is preferably made of laminated steel such as is commonly used in transformers, may be secured in any way to the end of the rod, as by fitting it over the end of the rod onto a shoulder formed thereon and by holding it in place by a nut as shown. On each of the four poles of the armature there is mounted a coil 17 formed of a suitable number of turns of insulated wire, these coils being designated as 1, 2, 3 and 4 in Figure 4 of the drawings. The turns or windings of the coils are arranged in such sense about the armature poles that current passed through them from a D. C. source will tend to establish like magnetic poles at opposite ends of the cross, for example coils 1 and 4 may establish south poles, while coils 2 and 3 may establish north poles. Suitable connecting wires are employed to couple the coils, as shown in Figure 3. Thus coils 1 and 2 are connected in series by means of their outermost turns, while coils 3 and 4 are similarly connected. The inner ends of coils 2 and 3 are connected and suitable leads are taken off from the loose ends of coils 1 and 4 and from the inner end of the coil 2, these leads being designated 18, 19 and 20, respectively. Insulating plate 21 made of any suitable material, such as bakelite, carries a set of three contact points 22 to which the several leads 18, 19 and 20 are connected.

Surrounding the armature there is provided an annular ring 23 made up of laminations similar to those employed in the armature itself. These may or may not be bound together, as desired, since they are squeezed tightly together by means of a locking ring 24 which forces them against a shoulder 25 at the upper end of the conical casing. The locking ring which is screw threaded into the upper end of the casing is preferably made of some non-magnetic material, such as brass. It is quite essential that considerable accuracy be provided in the fitting of the armature within the annular ring. For this reason the inside of the ring is preferably ground accurately to the desired diameter and similarly the ends of the pole pieces are ground to form an accurate, arcuate face. Normally there will be a slight clearance between the ends of the pole pieces and the inner surface of the annular ring. In practice it has been found desirable to provide a clearance of about .006 of an inch between each pole piece and the ring. A series of screws 26 pass through collars of appropriate length which serve to support the previously mentioned bakelite plate 21, the lower ends of these screws being fitted into threaded openings in the ring 25.

A cap 27, preferably formed of aluminum, is adapted to enclose the elements located at the upper end of the cone and is secured to the latter. For this purpose the cap is provided with a flange through which a series of bolts 28 pass into a corresponding flange 29 of the cone. An annular rib 30 formed on the lower surface of the cap and having its lower edge cut at an angle, as shown, is adapted to fit into an annular recess 31 in the upper end of the cone to provide a water-tight seal at this point. As an aid to the effectiveness of this seal the annular recess is preferably filled with some yielding material, such as rubber, to form a gasket. A small opening in the upper end of the cap is adapted to permit the passage of the cable 32 having three leads 33 which are connected to the contact points 22. In order to provide a water-tight connection surrounding the cable the latter fits as tightly as possible in the opening in the cap and there is also provided a stuffing box or gland construction in the upper portion of the cap. Thus a small reduced portion of the latter is closed off by a disk 34 which is supported from the top of the cap by a series of three bolts 35. The chamber thus provided may be filled with any suitable material, such as rubber.

In practice the device if used in solid ground must be inserted into the earth for the full length of the cone, which, as previously stated, may be about thirty inches. Since it would probably damage the instrument to attempt to force it directly into any very solid ground it is contemplated that conical holes of substantially the right dimensions may first be formed by means of a prod bar, for example, so that the detector need only be forced for the last few inches of its length. In so forming the device it has been found to establish a very intimate contact with the surrounding soil whereby any vibration of the latter, in its packed condition, will be readily transmitted to the casing. The armature 16, however, due to its inertia will tend to remain stationary on the upper end of the rod 14 thereby tending to decrease the air gap between certain of the poles and the annular ring 23 and at the same time increase the air gap between one or more of the remaining poles and the ring. This variation in the air gaps will, of course, tend to vary the flux passing through the several coils and will tend to induce an E. M. F. in each of them.

In Figure 3 there is shown diagrammatically the connections which have been found most satisfactory in the use of the detector for the reception of earth vibrations. In this view 37 designates a D. C. source of current which is connected in parallel with the two pairs of coils, namely, 1 and 2 in one branch of the circuit and 3 and 4 in the other branch. The circuit through the coils 1 and 2 may be returned through the section 38 of the primary winding of a transformer, while the circuit through the coils 3 and 4 may be returned through a section 39 of the same primary winding. When the apparatus is at rest the current flowing through the coils and through the sections of the transformer will be constant so that no current will be induced in the secondary winding 40 of the transformer. However, when a relative movement is produced between the armature and the annular ring, for example in the direction indicated by the arrow, the flux through coils 1 and 2 will be decreased due to the enlargement of the air gap and a current will, therefore, be induced in these coils which will be in the same sense as the current from the source 37. This added current may pass through the coil 38 in the direction indicated by the arrow 41. At the same time the flux through the coils 3 and 4 will be increased and a current opposing that supplied by the source 37 will be induced and this current, therefore, or change in current will have the general direction in coil 39, as indicated by the arrow 42. Thus it will be seen that the two induced currents in the coils 1 and 2 and the coils 3 and 4, respectively, will be added in their effect in passing through the primary of the transformer, so that a current equal to the combined effect will be induced in the secondary winding 40. Any suitable means may be provided for creating a visible or audible indication of the current changes in the transformer.

A feature to be noted in connection with the generation of the induced current in the manner specified is that the precise direction from which the vibration is received is not material, the magnitude of the effect produced in the transformer will be substantially the same for a given magnitude of vibration over a wide range of direction from which it may be received. This is brought about by the fact that the currents induced in each coil of a pair will be added to the current induced in the other coil of the pair. Considering the coils 1 and 2, for example, a vibration received in a horizontal direction, as shown, will induce a maximum current in coil 2 and practically no current in coil 1. On the other hand a movement in the vertical direction, as shown, will induce a maximum current in coil 1 and little or no current in coil 2. If the vibration is received from any intermediate direction within the 90° range between the horizontal and vertical it will generate a current in both coils corresponding to the horizontal and vertical components of the motion and the two currents in the coils 1 and 2 will be added. There is only a single definite direction from which a vibration will have no effect upon the transformer. This is a vibration substantially at right angles to the arrow shown in Figure 3. It will be seen that a vibration in this direction, say toward the upper left hand corner of the drawing, will increase the flux in coil 2 and correspondingly decrease the flux in coil 1 so that the two E. M. F.'s induced will be opposed and presumably equal. Similarly the two E. M. F.'s induced in coils 3 and 4 will be opposed and presumably equal so that the net effect will be zero. For any other direction of vibration there will at least be an effect equal to the difference between the horizontal and vertical components and, as already pointed out, for any vibration within 45° of the direction indicated by the arrow the effect of the two components will be added rather than subtracted. If desired an arrow may be placed on the cap of the instrument to correspond to the arrow on the diagram indicating the quadrant of its greatest sensitivity. In practice then this arrow should preferably be pointed in the known or assumed direction of the source of the wave. Reflected or refracted waves which it may also be desired to detect will in all probability fall within 45° of either side of this direction.

After the device has been used to pick up the desired waves at a particular location the instrument may be pulled out of the ground. To aid in this operation the upper end of the cone is provided with a pair of ears 43 and 44 each of which is provided with an eye bolt 45. It will be found that due to the intimate contact of the cone with the earth considerable pulling will be required to remove the instrument. The turning of the cone by forcing against one or both of the ears will aid in loosening it or a crow bar may be inserted below one of the ears to pry it up. When once loosened the instrument may be readily raised by means of the eye bolts.

If the device is to be used for the reception of sound or similar waves through water it is merely necessary to suspend the instrument by means of the eye bolts in such a way as to completely immerse the device. The instrument is entirely water-proof so that there is no danger of affecting the operation in any detrimental way.

Figure 4:
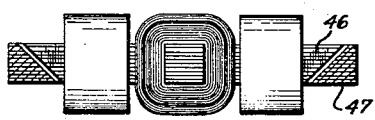
Figure 4 is a vertical section through the armature and laminated ring of a modification adapted to detect both horizontal and vertical components of a vibration.
Figure 5:
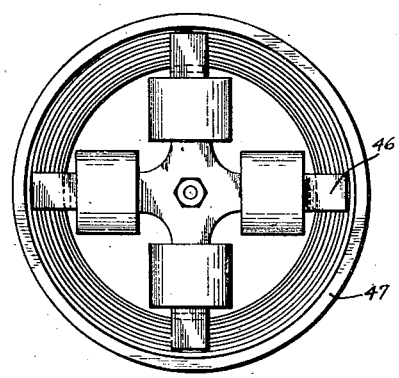
Figure 5 is a plan view of the parts shown in Figure 4.
Figure 5:
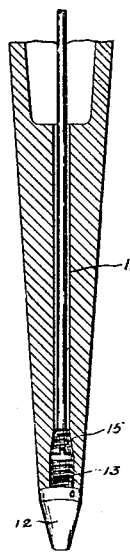
Figure 2:
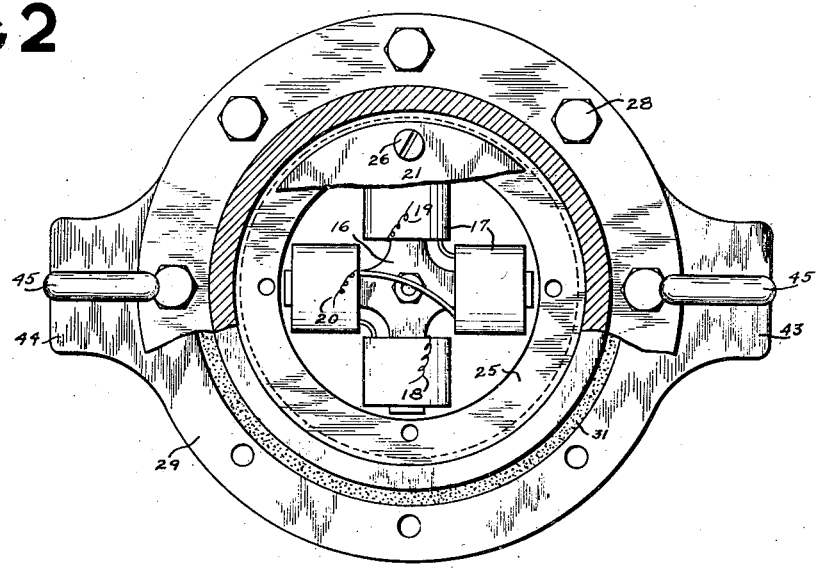
Figure 2 is a sectional view along the line 2—2 of Figure 1 with certain parts broken away to disclose others.

While the construction of the device, with respect to the mounting of the armature and the laminated ring, previously discussed, will permit of detecting vibrations to a certain extent in both the vertical and the horizontal directions, this form is particularly suited for the horizontal type of vibration and is not very well suited for detecting vibrations of the vertical type. Figures 4 and 5 illustrate a modification whereby the device may be rendered equally suited to the detection of horizontal and vertical vibrations. In this form of the invention the cooperating faces of the armature 46 and of the annular laminated ring 47 are formed at an angle of 45° and the armature and ring may then be located in the same plane, as indicated in Figure 4, with a portion of the arms of the cross overlapping a portion of the laminated ring. The supporting rod, similar to 14 of Figure 1, will preferably be of less diameter and will yield slightly to the weight of the armature. Vibrations received from directly below the device will then cause the casing, together with the ring 47, to rise slightly while the armature 46, due to its inertia, will remain substantially stationary so that the air gap will be reduced and the flux passing through all of the coils will be increased. On the other hand, if the vibration is received from a horizontal direction the cross will rock toward one side or the other and thereby decrease the air gap between one or more of the poles and the ring 47 and increase the air gap between one or more of the remaining poles and the annular ring.

Figure 6:
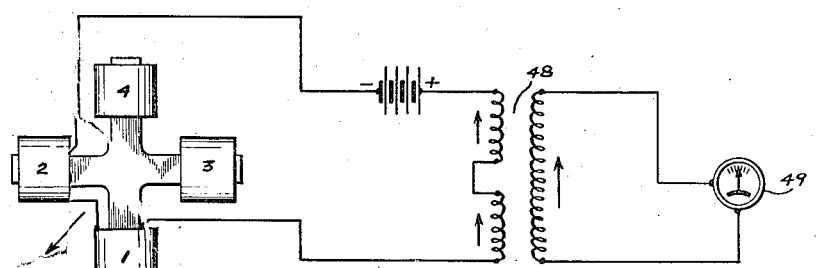
Figure 6 illustrates suitable connections for detecting both horizontal and vertical components by means of the construction shown in Figures 4 and 5.

Figure 6 illustrates one particular arrangement of circuits for detecting the vibrations received in either vertical or horizontal directions; it will, of course, also be affected by the two components of vibrations coming from any direction. For this purpose only two of the coils say, for example, 1 and 2, will be directly employed and the remaining coils 3 and 4 will be present only for the purpose of balancing the armature cross. The connection is such that the two coils are in series with each other and with a D. C. source of electricity as well as the two primary windings of the transformer 48. Obviously any vertical, upward movement of the casing with respect to the armature will increase the flux in both coils. Similarly a vibration received in a horizontal direction, such as indicated by the arrow in Figure 6, will serve to reduce the air gap and will, therefore, increase the flux in both coils. A change in the current in the primary windings of the transformer 48, as indicated by the arrow, will, therefore, result and a corresponding current will be induced in the secondary and may be indicated by any suitable means, such as the galvanometer 49.

In connection with the form of the invention, as hereinabove described, it is highly desirable to attain as nearly as possible the condition in which the casing and all of the parts which move directly therewith, form a mass not only having an average density equal to that of the displaced soil but one whose center of gravity is the same as that of the soil displaced. It will be apparent that the more nearly this condition is approached the more accurately the vibrations of the surrounding earth will be reproduced. Furthermore, it is desirable that the average density for each increment of length shall be substantially the same. Thus, for example, it is preferable, although it is practically impossible to carry it out precisely, to have the center of gravity of each horizontal section of the device of say an inch in height in coincidence with the center of gravity of the soil which occupied the same space. Adherence as closely as possible to this condition will avoid much of the distortion in the vibrations of the casing which would otherwise result.

While an admirable form or embodiment of the present invention has been disclosed in detail in the foregoing sections, it will be understood that many other changes may be made within the contemplation of the invention and which will fall within the scope of the claims which follow.

The invention described herein may be manufactured and used by or for the Government of the United States of America for Governmental purposes without the payment to me of any royalty thereon.

What I claim is:

1. In a vibration detector an elongated casing adapted to be supported in the earth in a vertical position, a magnetic ring secured therein in a horizontal position, an armature mounted within said ring and having pole pieces slightly spaced from said ring and cooperating therewith, the cooperating faces of said ring and pole pieces being parallel and beveled, at an acute angle with respect to the longitudinal axis of said casing coils on said armature, means for electrically energizing said coils to produce a flux between said ring and said pole pieces, means for supporting said armature and adapted to permit both longitudinal and transverse movement with respect to said casing and means for indicating the variation in flux through said coils due to movements of either type.

2. In a vibration detector an elongated casing adapted to be supported in the earth in a vertical position, a ring of magnetic material secured in said casing in a horizontal position, an armature mounted within said ring and having pole pieces spaced slightly from said ring and cooperating therewith, the faces of said pole pieces and the inner edge of said ring being beveled at an angle of substantially 45 degrees, to the longitudinal axis of said casing with said beveled faces closely adjacent and parallel to each other, coils on said armature, means for electrically energizing said coils to produce a flux across the space between said ring and said pole pieces, means for supporting said armature and adapted to permit both longitudinal and transverse movement of said armature with respect to said magnetic ring, and means for indicating the variations of flux through said coils due to movements of either type.

3. In a vibration detector an elongated casing adapted to be supported in the earth in a vertical position, a ring of magnetic material secured in said casing in a horizontal position, an armature mounted within said ring and having pole pieces mounted in close proximity to but slightly spaced from said ring, the faces of said pole pieces and the inner edge of said ring being parallel and bevelled at an angle of substantially 45 degrees to the vertical axis of said casing, coils on said armature, a source of direct current electricity, connections between said source of electricity and said coils so that said coils will be energized to produce a flux between said pole pieces and said ring, means for supporting said armature comprising a rod secured at its upper end to said armature and at its lower end to said casing, said rod being formed of a slightly yielding material so as to permit both longitudinal and transverse movement of said armature with respect to said ring when said casing is vibrated, and means for indicating the variations of flux through said coils due to movements of either type.

HARVEY C. HAYES.